United States Patent [19]

Camerlinck

[11] 3,975,174

[45] Aug. 17, 1976

[54] MANUFACTURE OF FOAM GLASS

[75] Inventor: Pierre Camerlinck, Paris, France

[73] Assignee: Saint-Gobain Industries, Neuilly-sur-Seine, France

[22] Filed: Mar. 3, 1975

[21] Appl. No.: 554,566

Related U.S. Application Data

[63] Continuation of Ser. No. 400,855, Sept. 26, 1973, abandoned.

[30] Foreign Application Priority Data

Oct. 9, 1972   France .............................. 72.35649

[52] U.S. Cl. ................................. 65/22; 106/40 V; 106/87; 264/43
[51] Int. Cl.² ...................................... C03B 19/08
[58] Field of Search ............... 65/22; 106/40 V, 87; 264/42–44

[56] References Cited
UNITED STATES PATENTS

| 3,189,512 | 6/1965 | Stong .................................. 65/22 X |
| 3,325,341 | 6/1967 | Shannon ............................. 65/22 X |
| 3,443,920 | 5/1969 | Overcashier et al. ................ 65/22 |
| 3,634,111 | 1/1972 | Foster ................................. 65/22 X |
| 3,788,865 | 1/1974 | Babcock et al. ..................... 65/33 X |

*Primary Examiner*—Robert L. Lindsay, Jr.
*Attorney, Agent, or Firm*—Pennie & Edmonds

[57] ABSTRACT

Finely divided glass, which may have a viscosity between $10^6$ and $10^7$ poises at 950°C to 1100°C and which may be of a composition suitable to conversion into a vitroceramic, is mixed with up to a few percent by weight of a foaming agent including a mixture of $SnO_2$ and SiC, in equimolar proportions or with an excess of SiC. The resulting mixture is heated to 950°C to 1100°C to effect foaming by evolution of $CO_2$ from the foaming agent, and the resulting glass foam is cooled. The nucleation and crystallization steps by which the glass is converted to a vitroceramic may be caused to occur without allowing the foam to return to room temperature.

11 Claims, No Drawings

MANUFACTURE OF FOAM GLASS

This is a continuation of application Ser. No. 400,855, filed Sept. 26, 1973, now abandoned.

The present invention pertains to the manufacture of foam glass (hereinafter called for simplicity glass foam), and particularly but without limitation to the manufacture of foam glass in which the glass is subjected to a process of ceramication, in which a portion of the glass is converted by heterogenous nucleation and crystal growth to a fine-grained crystalline state. One such process is disclosed in French patent No. 2,044,288, and in the copending application for U.S. patent of Jean Paul Tochon, Ser. No. 246,847, filed Apr. 24, 1972, and assigned to the assignee hereof, which corresponds to that French patent. Glass which has been subjected to such a process is sometimes called a vitroceramic.

Glass foams are obtained by the action of a gas-generating agent, herein termed a foaming agent, which is distributed through a starting mass of powdered or otherwise finely divided glass. The mixture of glass powder and gas-generating or foaming agent is heated to a temperature at which the viscosity of the glass is sufficiently low so that the gas evolved by the foaming agent forms in the molten glass a multitude of small bubbles which after solidification of the glass constitute the pores in the foam.

The foaming agents normally employed are usable only below 850°C and are hence not suitable for use with high-viscosity glasses.

The present invention pertains to the use of a new foaming agent whose utilization temperature is of the order of 1050°C and which can hence be used where the glass starting material is highly viscous. By this is meant viscosities between $10^6$ and $10^7$ poises at temperatures between 950°C and 1100°C. The foaming agent of the invention can also be used in cases where for other reasons it is desired to carry out the foaming at high temperatures. This is particularly the case when the starting glass is one which can be converted to a vitroceramic, i.e. is one which is "ceramifiable". A suitable composition for such glass is, for example, that described in French patent No. 2,044,288 and in the above-identified copending application. With ceramifiable glasses it is important, in order to avoid a premature crystallization, to operate at temperatures above the devitrification temperature.

In accordance with the invention, there is employed as a gas-generating agent a mixture of powdered stannic oxide ($SnO_2$) and silicon carbide (SiC).

Theoretically an equimolar mixture of $SnO_2$ and SiC should be employed, providing one molecule of stannic oxide for one molecule of silicon carbide, i.e. one mole of $SnO_2$ for one mole of SiC. A slight excess of SiC acting as a reducing agent is however desirable.

The granulometry of the foaming agent may vary within rather wide limits. In general however in accordance with the invention the desired particle size is of the order of a few microns.

The operation of this gas-generating or foaming agent depends on the fact that at a temperature of the order of 1050°C there occurs a reduction of $SnO_2$ by the SiC, with evolution of $CO_2$, which gas acts as the foaming agent proper.

The proportion of the gas-generating agent to be introduced in the starting glass material is of a few percent. In the case of the glass of French patent No. 2,044,288 the desired percentage is 2% by weight. There exists a maximum beyond which the quality of the foam obtained is deteriorated by the evolution of an excessive quantity of gas. The following example illustrates a preferred practice of the invention:

The starting glass had a composition in weight percent as follows:

| | |
|---|---|
| $SiO_2$ | 57.6 |
| $Al_2O_3$ | 6.6 |
| CaO | 17.3 |
| MgO | 4.7 |
| $Na_2O$ | 7.5 |
| $K_2O$ | 0.9 |
| F | 8.0 |
| deduct $O_2$ | 3.35 |

This glass was ground and screened to a granulometry such that all of the particles passed through a screen with a mesh of 125 microns.

To a quantity of this glass powder there was added a quantity of the gas-foaming material, amounting by weight to 1.5% of the glass powder, and itself containing by weight two parts of $SnO_2$ to one part of SiC. There was thus supplied an excess of SiC as a reducing agent. An equimolar mixture of $SnO_2$ and SiC, in an amount equal to 1.5% by weight of the glass, would means SiC in an amount equal to 0.32% by weight of the glass and $SnO_2$ in an amount equal to 1.18% by weight of the glass.

The powdered glass and gas-generating agent were carefully mixed and pressed while dry into blocks under a pressure of 50 bars.

The blocks were introduced into stainless steel molds having cross-section dimensions slightly larger than those of the blocks and a height of about 2.5 times that of the blocks, so as to limit the expansion to the most desirable ratio. Covers were then applied to close the molds.

The molds were made of rectangular plates having ribs of 4 mm thickness, connected by pins to define after assembly interior volumes 22 × 11 × 6 cm. The internal walls were covered with a lubricant made from aluminna so as to facilitate extraction of the foamed products.

The molds with the unfoamed blocks therein were introduced into an oven and heated to 1050°C for 30 minutes. They were then withdrawn and placed in an annealing oven at 700°C where the temperature was gradually lowered to 500°C at the rate of 2° per minute. The foamed product was then withdrawn from the oven. It was then ready to be subjected to a ceramification process such as described in the above-mentioned French patent No. 2,044,288.

The product obtained was characterized by a closed porosity (closed cells), by a density of 0.50 kg per thousand cubic cm and by a resistance to crushing exceeding 100 bars.

In a modification of the process the foaming temperature can be lowered to about 980°C by adding to the mixture of glass and foaming agent a small quantity of $CO_3Na_2$, in a proportion which is of the order of 2% by weight. This lowering of the foaming temperature is advantageous not only with respect to the caloric input requirements but also by reason of its favorable effect on the life of the mold.

The foaming operation in principle extends to the point of maximum expansion. This can be determined experimentally either by visual observation or by means of a gauge introduced into a mold having no cover.

The products of the invention, prepared from a ceramifiable glass, exhibit high resistance to crushing, much greater than that of non-crystallized glasses. This fact makes the product of the process of the invention suitable to multiple uses in building construction.

When this process is practiced with ceramifiable compositions which include more than 5% fluorine as nucleating agent, crystallization occurs immediately after foaming since these glass compositions have a nucleation phase which is non-critical as to thermal treatment.

The invention thus provides a process for the manufacture of glass foam which comprises heating finely divided glass with a mixture of $SnO_2$ and SiC to form a foam. The mixture of $SnO_2$ and SiC may amount to up to about 3%, but preferably not more than 1.5%, by weight of the weight of the glass. $CO_3Na_2$ may be added in an amount up to about 3% by weight of the weight of the glass in order to lower the foaming temperature.

I claim:

1. A process for the manufacture of glass foam comprising admixing a finely divided glass having a viscosity between $10^6$ and $10^7$ poises at a temperature between 950°C. to 1100°C. with a foaming agent consisting essentially of stannic oxide and silicon carbide and heating said mixture to a temperature between 950°C. to 1100°C. for a time sufficient to cause said mixture to foam, said stannic oxide and said silicon carbide each being present in said foaming agent in an amount sufficient to generate sufficient carbon dioxide gas to foam said mixture.

2. A process according to claim 1 including the further step of pressing said mixture into a predetermined shape prior to said heating step.

3. A process according to claim 1 including the further step wherein the said stannic oxide and silicon carbide is first admixed and then mixed with the said glass to form the ultimate mixture prior to said heating step.

4. A process according to claim 3 wherein said admixture of stannic oxide and silicon carbide includes $SnO_2$ and SiC in a proportion of at least one mole of SiC to one mole of $SnO_2$.

5. A process according to claim 3 in which said glass is a ceramifiable glass.

6. A process according to claim 5 wherein said glass includes in excess of 5% fluorine by weight.

7. A process according to claim 5 including the step of cooling the form directly to the crystallization temperature of the glass.

8. A process according to claim 1 in which the $SnO_2$ and SiC together have a weight not exceeding 3% by weight of the glass.

9. A process according to claim 1 in which the $SnO_2$ and SiC together have a weight of about 1.5% by weight of the glass.

10. A process according to claim 1 including the step of adding to the mixture prior to said heating step, an effective amount of finely divided $Na_2CO_3$ not exceeding 2% by weight of the weight of the mixture as a fluxing agent.

11. A process for producing a glass foam composition consisting essentially of $SiO_2$-$Al_2O_3$-CaO with minor portions of the oxides of magnesium, sodium, and potassium which process comprises the steps of forming a mixture of said glass composition and a foaming agent consisting essentially of stannic oxide and silicon carbide and heating said mixture to a temperature between 950°C. to 1100°C. for a time sufficient to cause said mixture to foam, said stannic oxide and said silicon carbide each being present in said foaming agent in an amount sufficient to generate sufficient carbon dioxide gas to foam said mixture.

* * * * *